United States Patent [19]

Perlotto

[11] 4,251,922
[45] Feb. 24, 1981

[54] UNIVERSAL PRESET TOOLING GAGE

[75] Inventor: George T. Perlotto, St. Clair Shores, Mich.

[73] Assignee: Premier Engineering Co., Inc., Madison Heights, Mich.

[21] Appl. No.: 44,235

[22] Filed: May 31, 1979

[51] Int. Cl.³ .............................................. G01B 5/02
[52] U.S. Cl. .............................. 33/181 R; 33/169 R; 33/172 R; 33/174 P; 33/1 M
[58] Field of Search ............. 33/181 R, 169 R, 172 R, 33/172 B, 174 P, 179.5 R, 179.5 B, 179.5 D, 1 M

[56] References Cited

U.S. PATENT DOCUMENTS

| 2,637,908 | 5/1953 | Hedman | 33/179.5 R |
|---|---|---|---|
| 3,066,420 | 12/1962 | Weber | 33/172 R |
| 3,217,418 | 11/1965 | Wennerberg | 33/172 R |
| 3,239,941 | 3/1966 | Ahmer | 33/1 M |
| 4,097,996 | 7/1978 | Yamazawa et al. | 33/172 R |

Primary Examiner—Willis Little
Attorney, Agent, or Firm—Whittemore, Hulbert & Belknap

[57] ABSTRACT

A tooling gage for gaging the accuracy of critical surfaces on a tool. The gage is universal in the sense that it may be used to check a wide variety of tools. The gage comprises a work holder and one or more adjustable gaging devices. Means are provided for securing each gaging device in adjusted position with respect to the tool.

7 Claims, 8 Drawing Figures

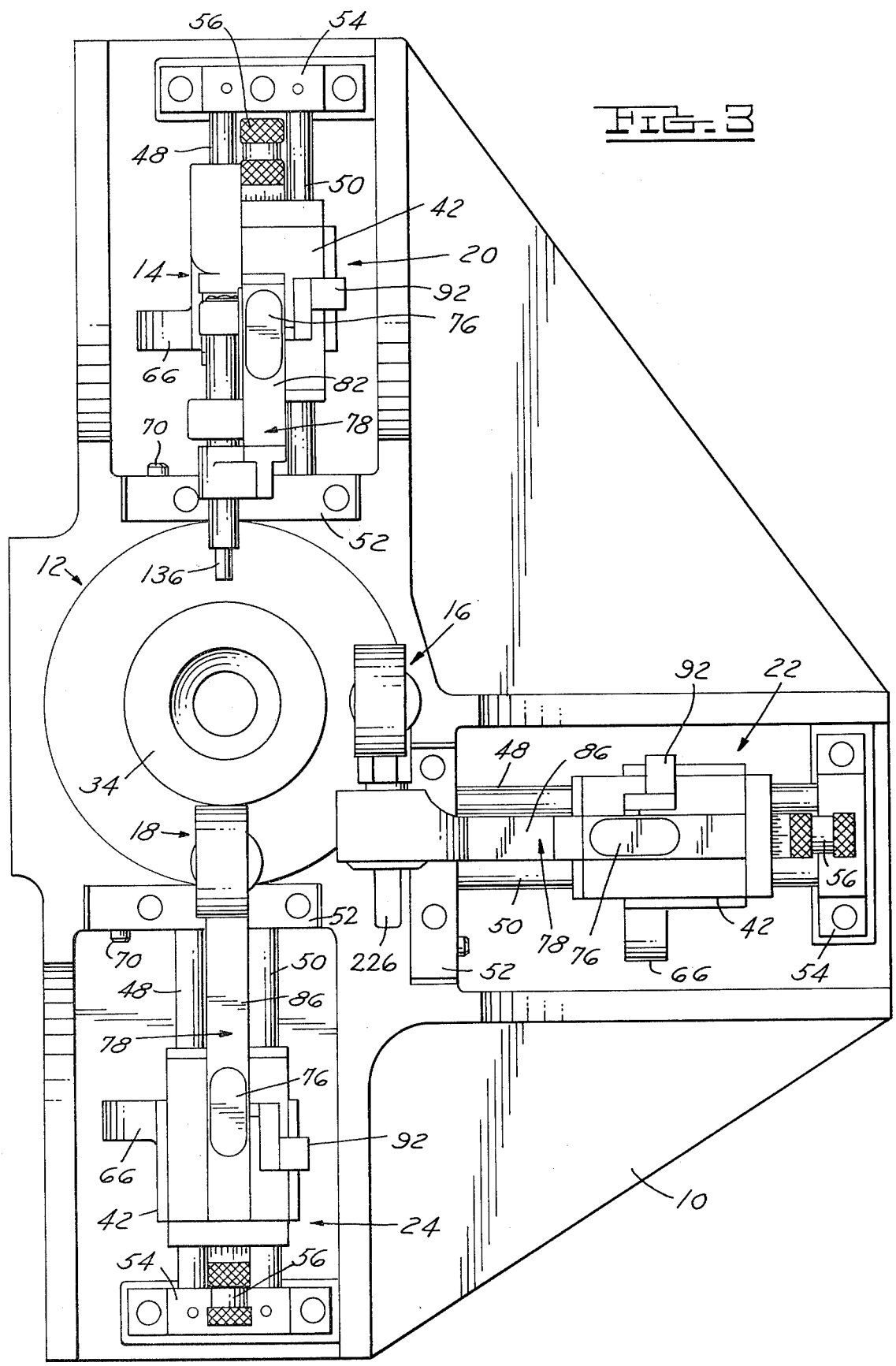

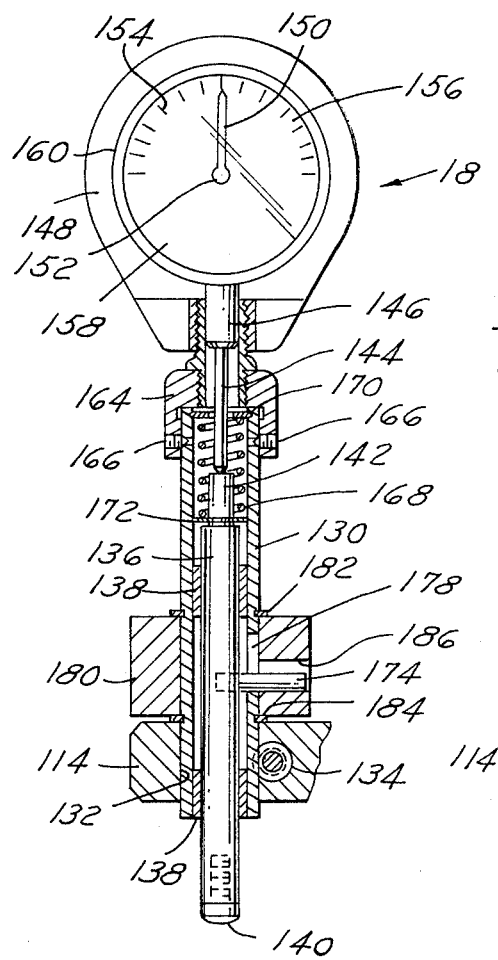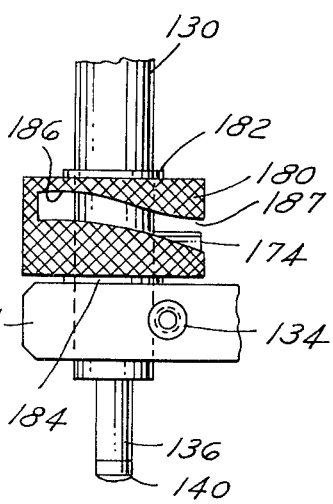

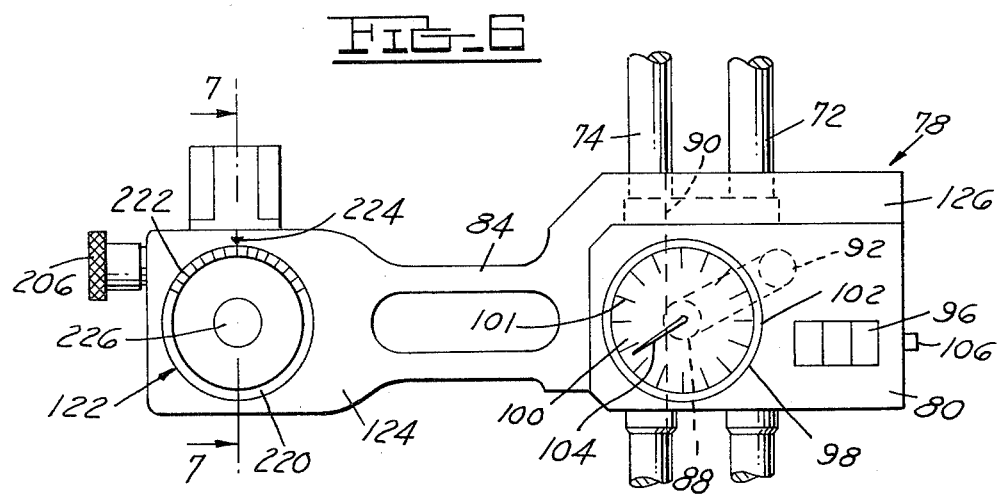
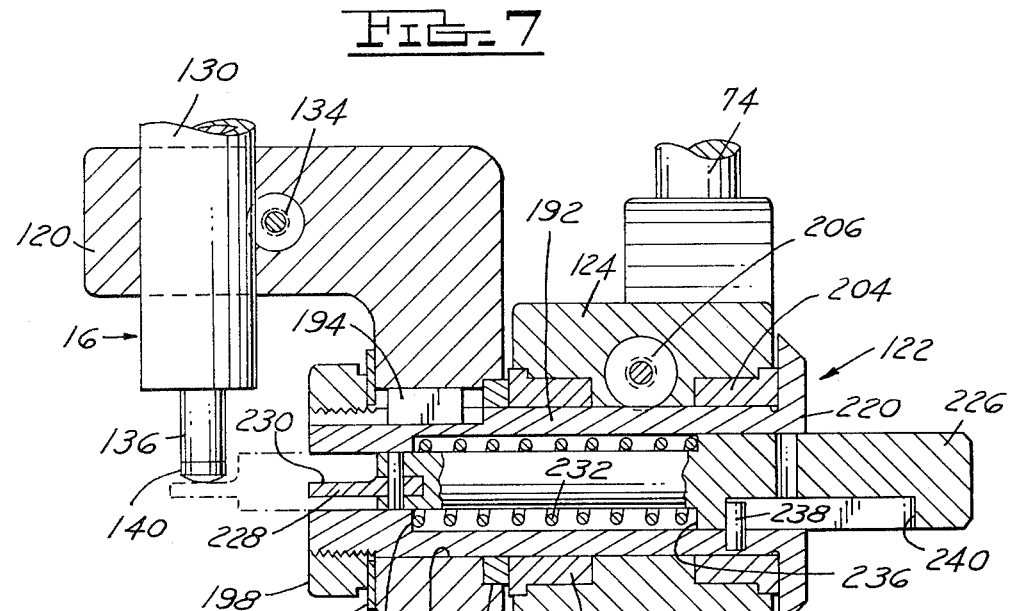
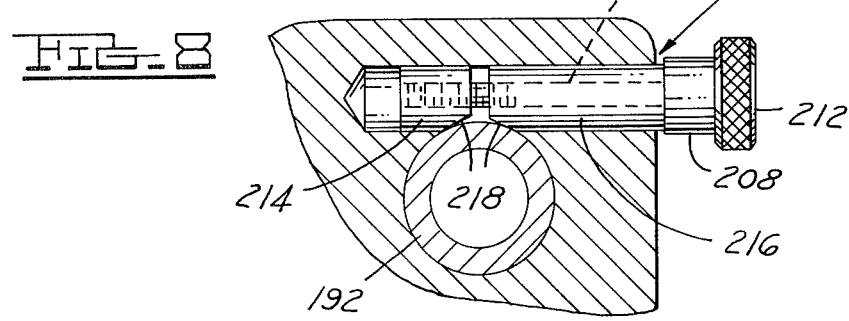

UNIVERSAL PRESET TOOLING GAGE

This invention relates generally to gages and refers more particularly to a universal preset tooling gage for gaging critical surfaces on a tool.

Heretofore a special gage and a master have been needed for each tool to be checked. To check a different tool, a different gage and a different master were needed.

The gage of the present invention is universal in the sense that it may be used to check many different tools. It has one or more adjustable gaging devices which may be secured in predetermined adjusted position to gage critical surfaces of a tool. A master is not needed.

In accordance with the specific embodiment about to be described, the gage has one or more gaging devices each provided with a feeler engageable with a critical surface of a tool held by a holder. Means are provided for adjustably mounting the gaging device in a position such that it may be used to gage a critical surface on the particular tool being checked.

Preferably, the gaging device has a gage indicator operated by the feeler to provide a visual indication of measurement.

More specifically, the adjustable mounting means for the gaging device comprises a first guide, a first carriage mounted for reciprocable movement on the first guide, a second guide mounted on the first carriage at right angles to the first guide, a second carriage mounted for reciprocable movement on the second guide, means mounting the gaging device on the second carriage, and means for releasably securing the first carriage to the first guide and the second carriage to the second guide in selected positions of adjustment.

Other objects and features of the invention will become more apparent as this description proceeds, especially when taken in conjunction with the accompanying drawings.

BRIEF DESCRIPTION OF THE DRAWINGS

FIG. 3 is a top plan view of the universal preset tooling gage.

FIG. 4 is an elevational view, with parts in section, of one of the gaging devices.

FIG. 5 is a fragmentary view in elevation of a portion of the gaging device shown in FIG. 4, as it appears when viewed from the right in FIG. 4.

FIG. 6 is a fragmentary elevational view taken on the line 6—6 in FIG. 2.

FIG. 7 is a sectional view taken on the line 7—7 in FIG. 6.

FIG. 8 is a fragmentary sectional view taken on the line 8—8 in FIG. 2.

DETAILED DESCRIPTION

Figure 1:
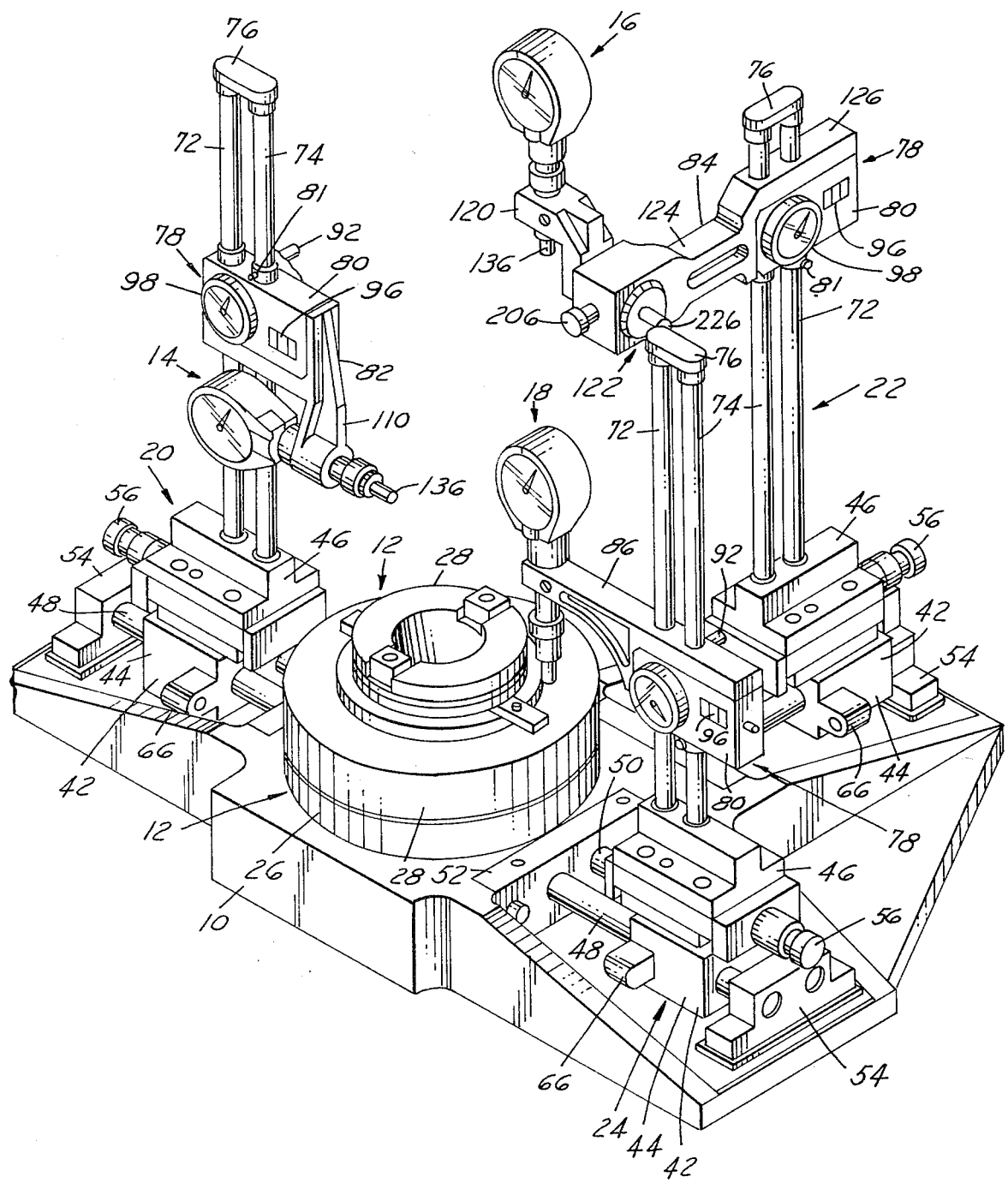
FIG. 1 is a perspective view of a universal preset tooling gage constructed in accordance with my invention.

Referring now more particularly to the drawings, the gage comprises a horizontal base 10 on which is mounted a table 12, gaging devices 14, 16 and 18 circumferentially spaced about the periphery of the table, and adjustable mounts 20, 22 and 24 for the gaging devices.

The base has an upwardly projecting annular table support 26. The table 12 includes a ring-shaped member 28 which in this instance is of generally inverted U-shaped cross section and fits over the annular table support 26. The ring-shaped member has a cylindrical liner 30 provided with a top lip 32 projecting radially outwardly and resting upon the top surface of the ring-shaped member.

Figure 2:
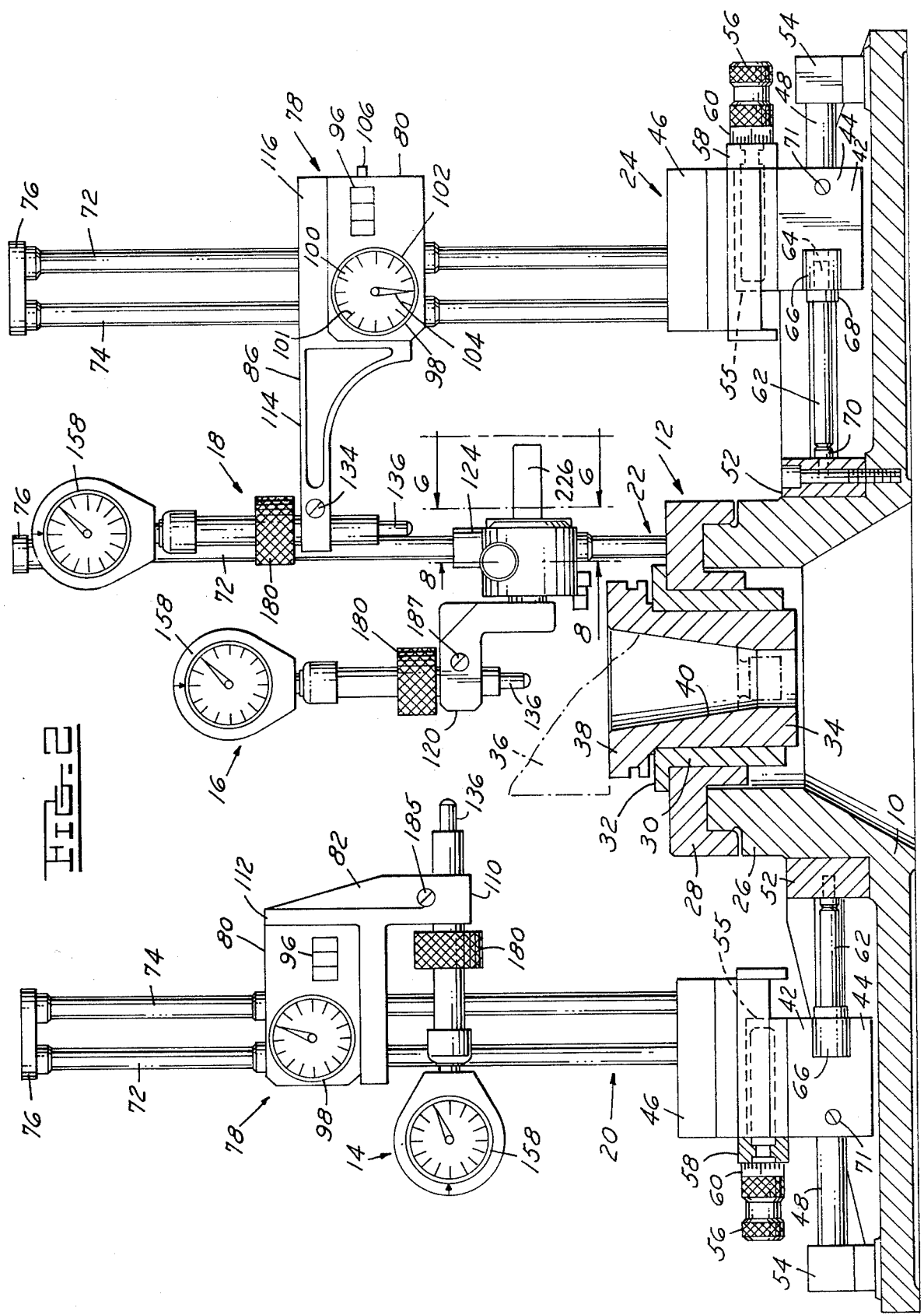
FIG. 2 is a side elevational view, with parts in section, of the universal preset tooling gage shown in FIG. 1.

A work holder or bushing 34 is provided to support the workpiece or tool 36 shown in dot-dash lines in FIG. 2. This bushing is a tubular member which fits into the bore of the liner 30 and has a radially outwardly extending annular flange 38 adapted to rest upon the lip 32 of the liner. The tool 36 is supported on the flange 38 of the liner and its shank fits within the liner. The taper of the wall of the liner preferably matches that of the shank of the tool.

Each of the mounts 20, 22 and 24 comprises a carriage 42 composed of a base 44 and a slide 46 mounted on the base. The carriage is mounted for horizontal movement radially with respect to the table on a guide comprising a pair of parallel laterally spaced guide rods 48 and 50. The ends of these rods are rigidly secured to plates 52 and 54 fixed upon the base 10.

The slide 46 is mounted on the base 44 of each carriage on ways 55 for sliding movement in a direction parallel to the rods 48 and 50. A micrometer screw 56 rotatably mounted in a block 58 on the slide 46 threads into the base 44 and is used for fine adjustment of the position of the slide with respect to the base and to indicate the position of adjustment on the scale 60.

End measures 62 in the form of elongated rods formed accurately to length may be employed to locate the carriages 42 in predetermined position with respect to the table. These end measures have pilot ends 64 which enter sockets in the lugs 66 on bases 44 and have shoulder abutments 68 adapted to bear against the lugs when the opposite ends thereof bear against the stops 70 on the plates 52. Set screws 71 on the carriage bases are advanced into engagement with one of the rods 48, 50 to lock the carriages in selected positions of adjustment.

Each mount has mounted atop the slide 46 a guide comprising a pair of vertical laterally spaced rods 72 and 74 held together in fixed parallel relation at the top by a connecting plate 76. Rods 72 and 74 are disposed at right angles to rods 48 and 50. A carriage 78 is slidably mounted on each pair of rods 72 and 74. Each carriage 78 comprises a carriage block and a gage holder. The carriage blocks are similar in construction and are identified by the reference character 80. The three gage holders are of somewhat different construction and are indicated by reference characters 82, 84, and 86. The carriage blocks 80 have internal gearing operated by a crank 92 and including a gear 88 (see FIG. 6) in mesh with the rack teeth 90 along the rod 74 whereby the carriage 78 may be raised and lowered on the rods by rotation of the crank. Lock screws 81 may be provided to lock carriages 78 in vertically adjusted position on rods 72 and 74. However, the gearing in the carriage block is such that the crank must be operated to raise or lower the carriage, the weight of the block, gage holder and gage being insufficient to produce accidental movement.

Each carriage block 80 has a gage indicator including a digital counter 96 and an indicator dial 98. Gage indicators of this general type are available on the market and record the distance moved by the carriage block. The indicator dial face is a glass cover 100 provided with graduations 101 and mounted in a circular frame 102 rotatably mounted on the carriage block so that the zero point on the dial face may be placed at any desired position of rotation with respect to the indicator dial pointer 104 which is connected to the internal gearing. A preset button 106 on the side of the carriage block is used to preset the digital counter to zero in any position of the carriage.

The gaging devices 14, 16 and 18 are of identical construction. The horizontal gaging device 14 is mounted on an arm 110 of gage holder 82 which has a bracket portion 112 affixed to the carriage block 80. The vertical gaging device 18 is mounted on an arm 114 of the holder 86, the holder 86 having a bracket portion 116 affixed to the block 80 of the carriage. The angular gaging device 16 is mounted on an arm 120 carried by a protractor 122 which is mounted on the arm 124 of the gage holder 84, the gage holder having a bracket portion 126 affixed to the carriage block 80.

The gaging device 18 is shown in detail in FIGS. 4 and 5 and it should be understood that the gaging devices 14 and 16 are of the same construction. The gaging device 18 has a cylindrical body 130 extending through a bore 132 in the arm 114 of the gage holder 86, being locked in axially adjusted position with respect thereto by a locking screw 134. An elongated feeler or pin 136 is supported lengthwise within the body 130 for axial sliding movement by the bushings 138, and has a tool engaging button 140 secured to the projecting end thereof. A reduced extension 142 on the opposite end of the pin 136 contacts the rod 144 which is axially slidably mounted in the sleeve 146 which provides an extension of the gage head 148. Conventional gaging mechanism within the gage head 148 connected to rod 144 turns the gage indicator 150 upon its axis 152 to register the axial position of the gage pin 136 by reference to the graduations 154 on the glass cover 156 of the dial face 158. This glass cover is mounted in a circular frame 160 rotatably mounted on the front of the gage head 148 so that the zero position on the dial face may be turned to any position of rotation.

The gage head 148 is mounted on a cap 164 which is secured in position over the upper end of the gage body by set screws 166.

The gage pin 136 is projected to its extended position shown in FIG. 4 by a compression coil spring 168 which encircles the lower end of the rod 144 and the reduced extension 142 of the gage pin, being compressed between the snap rings 170 and 172. Snap ring 170 is secured to the upper end of the gage body 130 and snap ring 172 is secured to the reduced extension 142 of the gage pin at the point where the reduced extension joins the main body portion thereof. A locating pin 174 projecting laterally from the gage pin 136 through an elongated slot 178 which extends lengthwise in the wall of the gage body 130 determines the extended position of the gage pin by engagement with the lower end of the slot.

A retracting collar 180 is sleeved on the gage body 130 over the portion thereof having the slot 178 and is retained thereon by snap rings 182 and 194 which permit the collar to rotate. The collar has a cam slot 186 into which the pin 174 projects. The cam slot 186 acting on the pin 174 will serve to retract the gage pin 136 from its extended position when the collar 180 is rotated from the position shown in FIGS. 4 and 5. In the position shown, the end 187 of cam slot 186 is widened so as not to interfere with the axial movement of gage pin 136 when in use.

The horizontal gaging device 14, as stated above, is of the same construction as the vertical gage 16. However, the gaging device 14 is oriented horizontally as shown in FIG. 2 and is locked in axially adjusted position on arm 110 by locking screw 185.

The gaging device 16 is of the same construction as the gaging device 18, as stated above, but is supported so as to enable it to be positioned at any angle, including horizontal and vertical. It is locked in axially adjusted position to arm 120 by locking screw 187.

Referring now to FIGS. 7 and 8, the arm 120, to which the body 130 of the gaging device 16 is locked by locking screw 134, is L-shaped, having a 90° extension provided with a bore 190 which receives the elongated tubular cylindrical body 192 of the protractor 122. Arm 120 is locked to the body 192 of the protractor 122 so as to rotate therewith by a key 194. The arm 120 is prevented from moving axially on the protractor body 192 by a washer 196 clamped against the end of the arm by a nut 198 threaded on the end of the protractor body. A ring 200 fitted in a counterbore in the arm 120 at the side thereof opposite the nut and washer assembly bears against bushing 202 so that the arm 120 is locked to the protractor body 192 against either axial or rotative movement relative thereto.

The protractor body is rotatably mounted in the arm 124 of the gage holder 84 by the bushings 202 and 204. It is locked in any desired position of rotative adjustment by a locking screw assembly 206 which comprises a screw 208 having a threaded shank 210 and a knob 212. This locking screw assembly 206 extends into a bore in the arm 124 of the gage holder and has a clamping element 214 into which the shank of the screw 208 threads. A second clamping element 216 is freely rotatably sleeved on the shank of the screw. The clamping elements 214 and 216 have coacting beveled faces 218 which clamp on the body 192 of the protractor when the screw is turned so as to cause the beveled faces of the clamping elements to approach one another and grip the outer surface of the protractor body and frictionally hold it against rotation.

The protractor body 192 has an integral disc 220 on one end provided with 360° of angular graduations 222 opposite a reference mark 224 on the arm 124 of the gage holder 84. Hence, the gaging device 16 may be turned to the desired angle by manually rotating the protractor body disc 220.

The tip of the button 140 on feeler 136 should lie on the central axis of rotation of the protractor body 192 in its zero position. Preferably the gage body is clamped to arm 120 by screw 134 so that when feeler 136 is fully extended to the limit permitted by slot 178, the tip of the button 140 projects slightly beyond such axis of rotation of the protractor body. In order to zero the feeler, an elongated plunger 226 is provided having a zeroing bit 228 secured to one end thereof. The plunger 226 is axially slidably mounted in the protractor body 192 so that zeroing surface 230 of its bit 228 always lies on the central axis of rotation of the protractor body. The plunger 226 is normally held in the retracted solid line position of FIG. 7 by the compression coil spring 232 which encircles the plunger and bears at its ends against the shoulder 234 of the protractor body and the shoulder 236 on the plunger. A pin 238 on the protractor body projects into an axial slot 240 in the enlarged end of the plunger, determining the retracted position of the plunger and permitting it to be extended to the dotted line position of FIG. 7 to establish the zero position of the feeler of gaging device 16. When the zero position is thus established, the glass cover 156 is turned to place the zero on the dial face opposite the gage indicator 150. Pin 238 of course constrains plunger 226 to rotate with the protractor body.

In the use of the gage, the vertical gaging device 18 is used to measure the vertical height from a reference point to a critical horizontal surface of the tool. The horizontal gaging device 14 is used to measure the horizontal distance from a reference point to a critical vertical surface of the tool. The angular gaging device 16 is used to measure the distance from a reference point to an angular surface of the tool.

Referring more particularly to the use of the vertical gaging device 18, the horizontally movable carriage 42 is moved manually to a position such that the feeler 140 on the gaging device 18 is directly above the reference surface. The reference surface may be any fixed horizontal surface on the gage structure, such for example as the top surface of flange 38 of the bushing 34 which supports the tool on the table. The vertically movable carriage 78 is then cranked down to a position in which the feeler 140 of the gaging device 18 rests lightly on the reference surface. With the feeler of the gaging device 18 in light pressure contact with the reference surface, the glass cover 156 of the gaging device is rotated to zero the dial face 158 with respect to the gage indicator 150, and the dial face 100 and digital register 96 on the carriage block 80 are also turned to zero.

The horizontal carriage 42 for the gaging device 18 is now backed off to withdraw the gaging device from the vicinity of the table. The carriage 78 is cranked up to an elevated position and a tool is placed in the bushing 34 on the table. The horizontal carriage 42 is then returned to approximately its initial position and the vertical carriage 78 is cranked down to bring the gage feeler 140 into light contact with the critical horizontal surface of the tool. The vertical carriage 78 may be raised or lowered slightly until the gage indicator of gaging device 18 registers zero on the dial. The exact difference in elevation between the critical surface of the tool and the reference surface is read directly from the dial and digital indicators 98 and 96 on the vertical carriage block 80, thus establishing the accuracy of location of the critical surface.

In order to gage a critical vertical surface of the tool, the vertical carriage 78 for the horizontal gaging device 14 is cranked to bring the gaging device 14 to the elevation of the reference surface which may be any vertical surface on the gage structure, such for example as the side edge of flange 38 of the bushing 34. The horizontal carriage 42 for the gaging device 14 is set with a suitable end measure 62 in a position such that the feeler 140 on the gaging device 14 is spaced slightly from the vertical reference surface. The carriage 42 may then be locked in that position by locking screw 71. Then the carriage slide 46 is advanced by the micrometer screw 56 until the feeler 140 of gaging device 14 comes into light pressure contact with the reference surface. With the feeler of the gaging device 14 in light pressure contact with the reference surface, the glass cover 156 of the gaging device 14 is rotated to zero with respect to the gage indicator 150. A micrometer screw reading is taken.

The carriage 42 for the gaging device 14 is unlocked and backed away from the table, a tool is inserted in the bushing 34 on the table and the carriage 42 is advanced back to the same position it occupied when gaging the reference surface as determined by the end measure employed for that purpose and locked in place. It will of course be necessary to crank the vertical carriage 78 to an elevation such that the gaging device 14 is at the elevation of the vertical surface of the tool to be gaged. The carriage slide 46 is then advanced by the micrometer screw until the feeler 140 of gaging device 14 touches the vertical tool surface and the dial indicator of the gaging device 14 registers zero. The exact distance between the reference surface and the critical vertical tool surface being gaged can then be determined from the reading of the micrometer screw, thus establishing the accuracy of location of the critical surface. If this distance is greater than the range of movement of the carriage slide, an end measure of another length may need to be used.

In order to gage an angular surface on the tool, that is a surface having an angle other than vertical or horizontal, the gaging device 16 is used. The zeroing mechanism for the gaging device 16 is carried by the holder for the gaging device as described hereinabove with particular reference to FIG. 7. The reference surface is the surface 230 on the zeroing bit 228 which is located precisely on the center of rotation of the protractor body 192. This zeroing bit carried by plunger 226 may be extended manually as shown in dotted lines in FIG. 7 to zero the gaging device 16. Initially, the gaging device is locked in a position by the locking screw 134 such that the tip or feeler 140 of its plunger will project slightly beyond the axis of rotation of the protractor body, so that it will be retracted slightly when in contact with the zeroing surface 230 of the zeroing bit, at which point the glass cover 156 of the gaging device 16 may be rotated to zero with respect to the gage indicator 150.

A suitable end measure 62 installed as shown in FIG. 2 may be used to establish a horizontal reference. A gage block similar to an end measure may be placed atop the carriage slide 46 for the gaging device 16 and the carriage 78 cranked down into contact with this gage block to thereby establish a vertical reference so that the dial and digital indicators on the carriage block 80 of the carriage 78 may be zeroed.

The carriages 42 and 78 for the gaging device 16 are then moved vertically and horizontally from the reference positions to bring the gage feeler into contact with a critical angled surface on the tool to be checked. The gaging device is of course first turned to the protractor angle corresponding to the angle of the critical tool surface and locked in that position by the locking screw 206. The gage feeler is brought into light pressure contact with the critical surface by horizontal and vertical adjustment of the two carriages until a zero gage reading on gaging device 16 is achieved. The difference in horizontal and vertical readings from the corresponding reference positions will establish by coordination the accuracy of the location of the angled surface on the tool.

The collar 180 of each gaging device is usually rotated from the position shown in FIGS. 4 and 5 to a position retracting gage pin 136 until just prior to the actual gaging of a surface.

It will be seen that the tooling gage may be used to critical surfaces on many different tools. A given tool when supported on the table can have three critical surfaces simultaneously checked for accuracy by the three gaging devices provided.

What I claim as my invention is:

1. A universal preset tooling gage comprising a tool holder, a gaging device having a feeler engageable with a critical surface of a tool held by said holder and also having a gage indicator operated by said feeler, means for adjustably mounting said gaging device in a position such that its feeler is in gaging relation to the critical surface on the tool held by said holder, said mounting means comprising a first guide, a first carriage mounted for reciprocable movement on said first guide, a second guide mounted on said first carriage at right angles to said first guide, a second carriage mounted for reciprocable movement on said second guide, means mounting said gaging device on said second carriage, means for releasably locking said first carriage to said first guide and said second carriage to said second guide in selected positions of adjustment, and a zeroing member mounted on said second carriage for movement from an operative to an inoperative position and having a gaging surface adapted to be engaged by said feeler for setting said gaging device to zero.

2. A gage as defined in claim 1, including means normally holding said zeroing member in inoperative position.

3. A gage as defined in claim 1, including spring means urging said zeroing member to inoperative position.

4. A universal preset tooling gage comprising a tool holder, a plurality of gaging devices each having a feeler engageable with a critical surface of a tool held by said holder and also having a gage indicator operated by said feeler, means for adjustably mounting each gaging device in a position such that its feeler is in gaging relation to a different critical surface on the tool held by said holder, comprising a horizontal guide, a horizontal carriage mounted for reciprocable movement on said horizontal guide, a vertical carriage mounted for reciprocable movement on said vertical guide, means for releasably locking said horizontal carriage to said horizontal guide and said vertical carriage to said vertical guide in selected positions of adjustment, said gaging devices being mounted on said respective vertical carriages, one of said second carriages having a rotatable protractor provided with a protractor body to which one of said gaging devices is secured, means for securing said protractor in selected positions of angular adjustment to thereby angularly adjust the position of said one gaging device, said protractor body being tubular, and a zeroing member mounted in said tubular protractor body for movement from an inoperative to an operative position, said zeroing member having a reference surface disposed on the axis of rotation of said protractor body and adapted to be engaged by the feeler of said one gage for setting said gaging device at zero when said zeroing member is in its operative position.

5. A gaging device as defined in claim 4, including spring means for normally urging said zeroing member to its inoperative position.

6. A universal preset tooling gage comprising a tool holder, a gaging device having a feeler engageable with a critical surface of a tool held by said holder and also having a gage indicator operated by said feeler, means for adjustably mounting said gaging device in a position such that its feeler is in gaging relation to the critical surface on the tool held by said holder, said adjustable mounting means comprising a carriage, means for securing said gaging device to said carriage in selected positions of angular adjustment, comprising a protractor having a body to which said gaging device is secured, means for locking said protractor in selected angular position, said protractor body being tubular, and a zeroing member for setting said gaging device to zero, said zeroing member comprising a plunger mounted in said tubular protractor body for axial movement from an inoperative to an operative position, said zeroing member having a reference surface engageable by the feeler of said gaging device in the operative position of said zeroing member.

7. A universal preset tooling gage comprising a tool holder, a gaging device having a feeler engageable with a critical surface of a tool held by said holder and also having a gage indicator operated by said feeler, means for adjustably mounting said gaging device in a position such that its feeler is in gaging relation to the critical surface on the tool held by said holder, and a zeroing member supported on said mounting means for movement from an operative to an inoperative position and having a gaging surface adapted to be engaged by said feeler for setting said gaging device to zero.

* * * * *